UNITED STATES PATENT OFFICE.

OSCAR LIEBREICH, OF BERLIN, GERMANY.

MANUFACTURE OF SOAP.

SPECIFICATION forming part of Letters Patent No. 281,089, dated July 10, 1883.

Application filed May 5, 1883. (No specimens.) Patented in England April 12, 1882, No. 1,725, and in Germany April 12, 1882.

*To all whom it may concern:*

Be it known that I, OSCAR LIEBREICH, a subject of the King of Prussia, residing at Berlin, in the Kingdom of Prussia and German Empire, have invented new and useful Improvements in the Manufacture of Soap, of which the following is a specification.

In the United States Patent No. 265,520, granted to me October 3, 1882, a process is described for the direct saponification of oleiferous fruits, grains, or seeds, which consists in first subjecting such fruits, grains, or seeds to a roasting operation, then treating the product thus obtained with an alkaline lye, and finally separating the parts which have saponified from those not saponified. In treating fruits, grains, or seeds which contain fatty matters capable of being saponified without being heated, (such fatty matter being termed in the following description "cold saponifiable fats,") the desired result can be attained by subjecting the fruits, grains, or seeds, in a fresh or air-dried condition, to the process above named without roasting. As examples of fruits containing cold saponifiable fats, the palm fruits, and especially the cocoanut, may be mentioned.

In applying my invention to cocoanut-kernels, for instance, I proceed as follows: I take, say, one hundred parts, by weight, of cocoanut-kernels, and cut the same up into cubical pieces, the sides of which are from one-half to to three-fourths of an inch in length. These pieces I expose to the open air until they become dry, and then I pass them through crushing-rollers until they have been converted into a pasty mass. By this operation the cellular texture of the kernels is destroyed, and the oil contained therein is exposed as much as possible to the chemical action of the lye applied afterward. To this mass is added a corresponding quantity of an alkaline lye, such as soda lye. The quantity of lye depends upon the percentage of fatty matter contained in the mass, so that for about one hundred parts, by weight, of fatty matter twelve and one-half parts of anhydrous soda is taken. An excess of caustic soda, respectively soda lye, is required for carrying out the process. In practice it is best to use a soda lye of the specific gravity of 1.335, so that for one hundred parts, by weight, of fatty matter about 70.78 parts, by weight, of lye are used. If the air-dried cocoanut contain sixty-five per cent. of fatty matter, about 8.25 parts, by weight, of anhydrous soda, or about forty-seven parts, by weight, of soda lye, (specific gravity 1.335,) are required. After the saponification has been effected by the action of the lye, the mixture, which already contains the saponified product, is thoroughly stirred or kneaded for several hours, exposed to a heat of 100° centigrade, and during this time about the same quantity of water is added as that which escapes by evaporation, so that the degree of concentration of the lye remains practically unchanged during the evaporation. The mass may also be heated by injecting steam, and in this case no addition of water is needed. The object of this process is to destroy the albuminous matters contained in the mass by the action of the lye. After the mass has been cooled off, it is repeatedly washed with large quantities of water, strained, and pressed, and the product thus obtained is heated to evaporate its liquid contents, so that a so-called "black raw soap," or, if salt is added, a grain-soap, is obtained.

In treating the kernels of cocoanut containing sixty-five per cent. of fat, as above stated, one hundred parts, by weight, of the raw product, after having been treated with salt, yield from eighty-seven to ninety-seven parts, by weight, of soap containing nineteen per cent. of water. This example shows that the process described in my Patent No. 265,520 can be applied to cold saponifiable fruits, grains, or seeds without subjecting them to a previous roasting, and that a larger yield is obtained than by the process heretofore used in manufacturing soap.

I am aware of Patent No. 269,820, of 1881, in which the material is crushed in its natural state, and such process is not sought to be covered in this application.

What I claim as new, and desire to secure by Letters Patent, is—

The within-described process for producing soap from fruits, grains, seeds, &c., consisting in the following steps—namely, drying the fruits, seeds, or grains, subjecting them to the action of alkaline lye or caustic soda for saponifying the same, and finally separating the saponified parts from the rest, substantially as described.

In testimony whereof I have signed my name to this specification in the presence of two subscribing witnesses.

OSCAR LIEBREICH.

Witnesses:
B. ROI,
M. M. RASSEN.